United States Patent

[11] 3,583,377

| [72] | Inventor | Joseph R. Graziano<br>512 West Alosta Ave., Glendora, Calif. 91740 |
|---|---|---|
| [21] | Appl. No. | 776,227 |
| [22] | Filed | Nov. 15, 1968 |
| [45] | Patented | June 8, 1971 |

[54] FUEL VAPORIZER APPARATUS
1 Claim, 3 Drawing Figs.

[52] U.S. Cl. ................................................. 123/141, 123/122, 123/131
[51] Int. Cl. .................................................. F02m 29/00, F02m 31/00, F02m 5/00
[50] Field of Search .................................. 123/141, 131, 125, 126, 122 A, 122 A1, 122 A2, 122 A3, 122 F

[56] References Cited
UNITED STATES PATENTS

| 1,106,452 | 8/1914 | Ittner | 123/141 |
| 1,189,797 | 7/1916 | Deppe | 123/122 |
| 1,361,477 | 12/1920 | Meriam et al. | 123/122 |
| 1,506,601 | 8/1924 | Nelson | 123/141 |
| 2,027,480 | 1/1936 | Higley | 123/141 |
| 2,125,899 | 8/1938 | Ericson | 123/122 |
| 2,378,344 | 6/1945 | Warrick | 123/122 |
| 2,611,353 | 9/1952 | Allday | 123/122 |
| 2,643,647 | 6/1953 | Meyer et al. | 123/122 |
| 3,437,467 | 4/1969 | Jacobus | 123/141 |
| 2,560,220 | 7/1951 | Graziano | 123/122 |

FOREIGN PATENTS

| 302,221 | 4/1929 | Great Britain | 123/122 |
| 499,776 | 6/1930 | Germany | 123/122 |

*Primary Examiner*—Wendell E. Burns
*Attorney*—Victor J. Evans and Co.

ABSTRACT: An improved fuel vaporizer apparatus in which there is a container or atomizing chamber between the carburetor and the intake chamber below the carburetor, in which there is a diffusing metal cone formation within such atomizing chamber supported from the base of the atomizing chamber by a rod, and in which the metal cone formation diffuses gases into broken-up globules of vaporization for passing through the wall of said container and into the intake openings of the internal combustion engine. This device improves the effective smog control by operating the engine in a more complete burning of the fuel mixture, resulting in increased efficiency and economy of operation, reduction of carbon deposition, and reduction of smog emission.

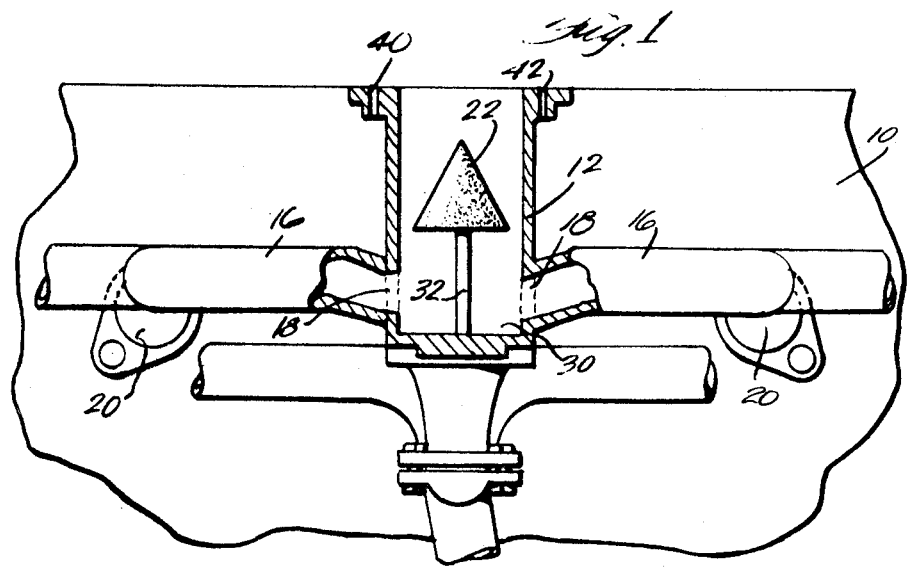
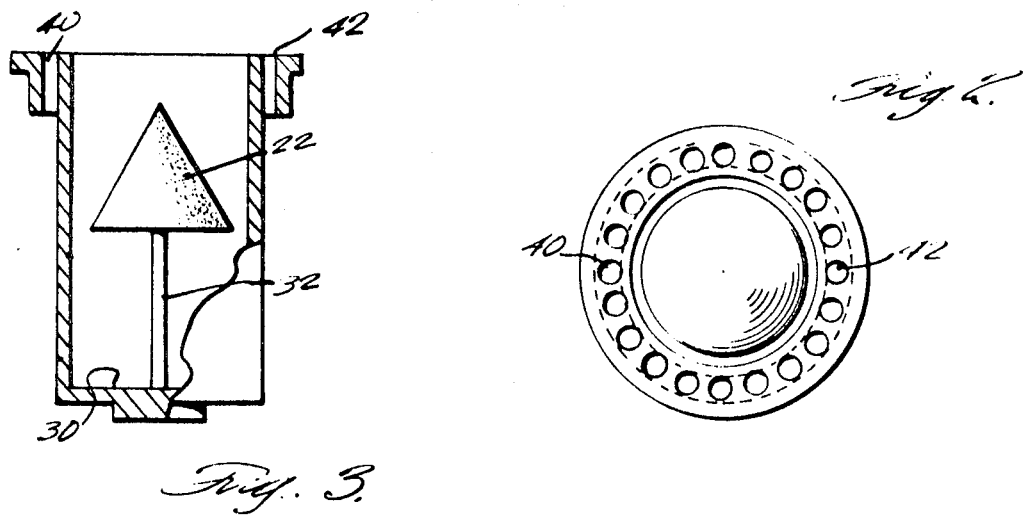

FUEL VAPORIZER APPARATUS

The present invention relates to an improved fuel vaporizer apparatus in which there is a conical metal formation or element within an atomizing chamber, in which there is diffusion or divergence of the fuel from the carburetor into broken-up globules of vaporization, resulting in more efficient operation of an internal combustion engine, to which it is connected.

An object of the present invention is to provide a device for improving the operation of an internal combustion engine so that the inflow of the fuel-air mixture is directed to the walls of the device by the cone element. The diverged fuel is then further broken up into the finest possible globules as it passes through the walls of the device and into the intake manifold where the heat and the pressure complete the vaporization of the fuel and its combustion resulting in an optimum condition of the fuel-air mixture.

The device has the following improved characteristics: (1) Improves starting in any weather and temperature; makes possible perfect idle adjustment; (2) each cylinder receives equal volume of fuel-air charge; (3) Numerous operating tests on the newest high compression engines prove that this device gives knock-free performance using regular gasoline; (4) Fuel utilization is greater, power and mileage are increased; (5) Crankcase oil dilution resulting from unburned fuel "blow-by" virtually eliminated; (6) Carbon deposits and carbon monoxide formations reduced, due to complete combustion of fuel; and virtually eliminated the vapor locks; (7) The fuel vaporizer prevents a back-firing, thereby reducing fire risk and possible engine damage; (8) Because of the complete combustion of the fuel, exhaust gases containing smog-constituents are greatly reduced; (9) Eliminates spark plug pinging by providing optimum conditions for complete combustion of all fuel vapors. This results in substantial savings of fuel and maintenance costs. The device is achieved through changing fuel ratio characteristics; (10) Once this device has been installed, it will remain good as long as the life of the engine itself; (11) The device is a simple do-it-yourself type of unit that can be installed without altering the carburetor or manifold; one unit required per barrel.

The above and other objects and advantages of the invention will become apparent upon full consideration of the following detailed description and accompanying drawings, in which:

FIG. 1 is a side elevation view of the improved fuel vaporizer apparatus, and in which a portion of the intake atomizing chamber is shown in cross section, according to the best mode and preferred embodiment of the present invention;

FIG. 2 is a plan elevation view of the atomizing chamber with its cover thereon; and FIG. 3 is a cross-sectional view of the atomizing chamber shown in enlarged detail.

Referring now to the drawings, there is shown a conventional internal combustion engine 10 having a casing forming an atomizing chamber 12, an intake chamber 16, 16 disposed near the bottom of and connecting with the atomizing chamber by openings 18, 18, the intake chamber 16, 16 connecting with the intake openings of 20, 20 of the internal combustion engine, and a diffusing metal cone formation 22 positioned within the atomizing chamber. The metal cone formation 22 is supported from the base 30 of the atomizing chamber 12 by a rod 32.

The rod 32 extends from the base 30 of the atomizing chamber, and there is means disposed at the opposite end of the atomizing chamber for connecting the atomizing chamber 12 to a carburetor (not shown) that is secured thereto by bolts which are fixed through the bolt openings 40, 42.

The cone formation 22 is seen to diverge and disperse fuel from the carburetor attached to the upper end of the atomizing chamber and which is fed into it, so that the fuel is broken into small globules of vaporization for passing through the wall openings 18, 18 of said casing into the intake openings 20, 20, through the intake 16, 16, respectively.

In the preferred embodiment, it is found that the cone formation 22 is coaxially or centrally disposed within said atomization chamber 12 for diverging fuel equally into all directions and into all intake openings 18, 18.

The present invention is seen as an improvement on and over U.S. Pat. No. 2,560,220, issued July 10, 1951 to Graziano in class 219, subclass 38, to the same inventor.

The present application is directed to a device made by a sintering process which requires the making of a mold and a core mold, and the molding goes to the oven o be sintered. Because of the sintering process, the size of the porosity of the filter forming the cone formation therein will be determined by the size of the grain and the thickness of the filter wall about and adjacent the openings 18, 18, which are shown to be open but may be substantially imperforate, as shown by dotted line in FIG. 1, and which are shown as solid throughout in FIG. 3. By this means, the device of the invention is seen to break up the fuel and the fuel is seen to burn completely throughout, resulting in substantially 99 percent complete fuel combustion.

Additional embodiments of the invention in this specification will occur to others and therefore, it is intended that the scope of the invention be limited only by the appended claims and not by the embodiments described hereinabove. Accordingly, reference should be made to the following claims in determining the full scope of the invention.

I claim:

1. An improved fuel vaporizer, comprising a cylindrical casing forming an atomizing chamber, an intake chamber comprising a plurality of pipes, each having an end positioned near the bottom of the outside surface of said casing and in fluid communication with the atomizing chamber, a carburetor secured above said casing allowing fuel to flow into said atomizing chamber, and a single, completely incombustible and solid, deflecting metal cone formation within and completely enclosed by the cylindrical wall of said atomizing chamber, said cone formation being pointed upward and coaxial with said casing for deflecting the fuel equally in all directions prior to vaporization thereof so that an equal amount of fuel passes into said end of each of said plurality of pipes, said casing comprising a porous filter material directly in front of each said end of each of said plurality of pipes for breaking up the deflected fuel into globules of vaporization while passing into said pipes of said intake chamber resulting in increased power and mileage and decreased carbon deposits and exhaust pollutants.